(12) United States Patent
Lin et al.

(10) Patent No.: US 10,489,591 B2
(45) Date of Patent: Nov. 26, 2019

(54) DETECTION SYSTEM AND METHOD THEREOF

(71) Applicant: INSTITUTE FOR INFORMATION INDUSTRY, Taipei (TW)

(72) Inventors: Chih-Hung Lin, New Taipei (TW); Chia-Wei Tien, Taichung (TW); Tse-Yung Huang, New Taipei (TW); Chin-Wei Tien, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 228 days.

(21) Appl. No.: 15/186,529

(22) Filed: Jun. 19, 2016

(65) Prior Publication Data

US 2017/0169223 A1 Jun. 15, 2017

(30) Foreign Application Priority Data

Dec. 11, 2015 (TW) .............................. 104141780 A

(51) Int. Cl.
*G06F 21/56* (2013.01)
*G06F 8/53* (2018.01)

(52) U.S. Cl.
CPC .............. *G06F 21/566* (2013.01); *G06F 8/53* (2013.01); *G06F 2221/034* (2013.01)

(58) Field of Classification Search
CPC ........ G06F 21/566; G06F 21/563; G06F 8/53; G06F 2221/034; G06F 11/3668
See application file for complete search history.

(56) References Cited

U.S. PATENT DOCUMENTS

| | | | |
|---|---|---|---|
| 7,814,544 B1 * | 10/2010 | Wilhelm | G06F 21/566 719/328 |
| 2014/0068768 A1 * | 3/2014 | Lospinuso | G06F 21/562 726/23 |

(Continued)

FOREIGN PATENT DOCUMENTS

| CN | 103092761 A | 5/2013 |
|---|---|---|
| CN | 104751054 A | 7/2015 |

OTHER PUBLICATIONS

The office action of the corresponding Taiwan application dated Nov. 7, 2016.

*Primary Examiner* — Cheng-Feng Huang
(74) *Attorney, Agent, or Firm* — CKC & Partners Co., LLC

(57) ABSTRACT

A detection system and method thereof are provided. The detection method comprises the following steps: decompiling a first application package file to generate a plurality of first decompiled files, and the first decompiled files comprising a first decompiled code; comparing the first decompiled code with a second decompiled code of a second application package file to analyze a different code segment between the first decompiled code and the second decompiled code; classifying a changed code type corresponding to the different code segment according to a function call flow of the first decompiled code; loading a correspondence table and selecting at least one detection rule corresponding to the changed code type in the correspondence table; confirming a detection region of the first decompiled code according to the at least one detection rule; and detecting the detection region to generate a security detection result.

15 Claims, 4 Drawing Sheets

(56) References Cited

U.S. PATENT DOCUMENTS

| | | | |
|---|---|---|---|
| 2014/0130158 A1* | 5/2014 | Wang | G06F 21/566 726/23 |
| 2014/0281545 A1* | 9/2014 | Erofeev | G06F 21/6218 713/171 |
| 2015/0193624 A1* | 7/2015 | Tong | G06F 21/577 726/25 |
| 2015/0205963 A1* | 7/2015 | Zou | G06F 21/566 726/23 |
| 2015/0227746 A1* | 8/2015 | Chen | G06F 21/577 726/25 |
| 2016/0378447 A1* | 12/2016 | Nandakumar | G06F 8/53 717/108 |
| 2017/0076072 A1* | 3/2017 | Koren | G06F 21/105 |

* cited by examiner

| Changed Code Type | | | Detection Rule | | |
|---|---|---|---|---|---|
| Parameter Value Variance | Single Function Call Variance | Function Call Flow Variance | First Rule | Second Rule | Third Rule |
| | | ✓ | | | ✓ |
| | ✓ | | | ✓ | |
| | ✓ | ✓ | | ✓ | ✓ |
| ✓ | | | ✓ | | |
| ✓ | | ✓ | ✓ | | |
| ✓ | ✓ | | ✓ | ✓ | ✓ |
| ✓ | ✓ | ✓ | ✓ | ✓ | ✓ |

DETECTION SYSTEM AND METHOD THEREOF

RELATED APPLICATIONS

This application claims priority to Taiwan Application Serial Number 104141780, filed Dec. 11, 2015, which is herein incorporated by reference.

BACKGROUND

Field of Invention

The present invention relates to a detection system and a method thereof. More particularly, the present invention relates to a detection system for detecting an application revision and a method thereof.

Description of Related Art

With the popularity of applications, revisions of the applications for various electronic devices have become increasingly frequent. The current application detection systems mainly provide disassembling methods for applications, such that program developers can determine whether the application is malware after obtaining the source code together with determining the call weight of the application programming interface (API). In addition, in some conventional detection systems, the similarity between two applications is determined by searching for keywords in the source codes in cooperation with a statistical learning mechanism after deconstructing the applications However, under the circumstances that many applications are frequently revised, tremendous manpower and time resources need to be consumed to detect a new version of each of the applications if the whole new version of the application is detected to determine whether the new version of the application is secure.

For the forgoing reasons, there is a need to efficiently detect a new version of an application by providing a detection system and a method thereof.

SUMMARY

A detection system is provided. The detection system comprises a decompiler module, a module for comparing and classifying a revised application variance, and an information security detection module. The decompiler module is configured to decompile a first application package file to generate a plurality of first decompiled files, and the first decompiled files comprise a first decompiled code. The module for comparing and classifying the revised application variance is configured to compare the first decompiled code with a second decompiled code of a second application package file, analyze a different code segment between the first decompiled code and the second decompiled code, classify a changed code type corresponding to the different code segment according to a function call flow of the first decompiled code, load a correspondence table between a change type and a rule, and select at least one detection rule corresponding to the changed code type in the correspondence table between the change type and the rule. The information security detection module is configured to selectively update or establish a data flow according to the at least one detection rule, and confirm a detection region of the first decompiled code according to the data flow, and detect the detection region to generate a security detection result.

The invention provides a detection method. The detection method comprises: decompiling a first application package file to generate a plurality of first decompiled files, and the first decompiled files comprising a first decompiled code; comparing the first decompiled code with a second decompiled code of a second application package file, analyzing a different code segment between the first decompiled code and the second decompiled code, classifying a changed code type corresponding to the different code segment according to a function call flow of the first decompiled code; loading a correspondence table between a change type and a rule, and selecting at least one detection rule corresponding to the changed code type in the correspondence table between the change type and the rule; updating or establishing a data flow according to the at least one detection rule selectively, and confirming a detection region of the first decompiled code according to the data flow; and detecting the detection region to generate a security detection result.

The invention further provides a non-volatile computer readable recording medium storing a computer program configured to perform a detection method applied to a detection system. The detection method comprises: decompiling a first application package file to generate a plurality of first decompiled files, and the first decompiled files comprising a first decompiled code; comparing the first decompiled code with a second decompiled code of a second application package file, analyzing a different code segment between the first decompiled code and the second decompiled code, classifying a changed code type corresponding to the different code segment according to a function call flow of the first decompiled code; loading a correspondence table between a change type and a rule, and selecting at least one detection rule corresponding to the changed code type in the correspondence table between the change type and the rule; updating or establishing a data flow according to the at least one detection rule selectively, and confirming a detection region of the first decompiled code according to the data flow; and detecting the detection region to generate a security detection result.

In summary, the technical solution of the present invention has obvious advantages and beneficial effects as compared with the prior art. Through the above technical solution, considerable advances in technology and extensive industrial applicability can be achieved. The different code segment between the application that has not been revised and the new version of the application can be detected according to the present disclosure. Hence, the security detection result of the new version of the application can be obtained by only detecting the different code segment and the program relating to the different code segment. That is, the present invention detection system does not need to detect the whole new version of the application. Therefore, the present invention avoids the repeated consumption of the detection resources and provides a more efficient detection system and a method thereof.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 3 depicts a schematic diagram of a correspondence table between a change type and a rule according to one embodiment of this invention.

DETAILED DESCRIPTION

Figure 1:
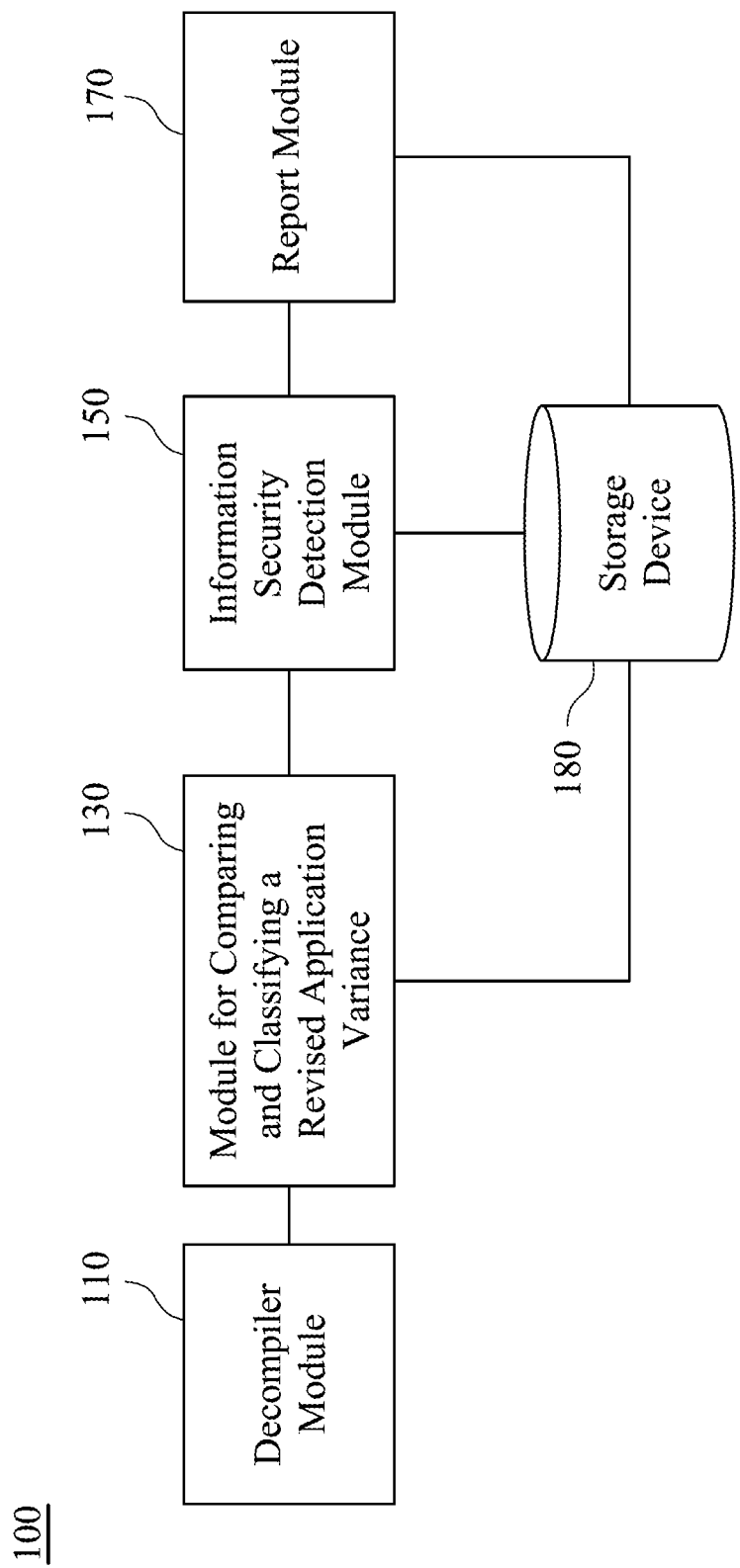
FIG. 1 depicts a block diagram of a detection system according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Figure 2:
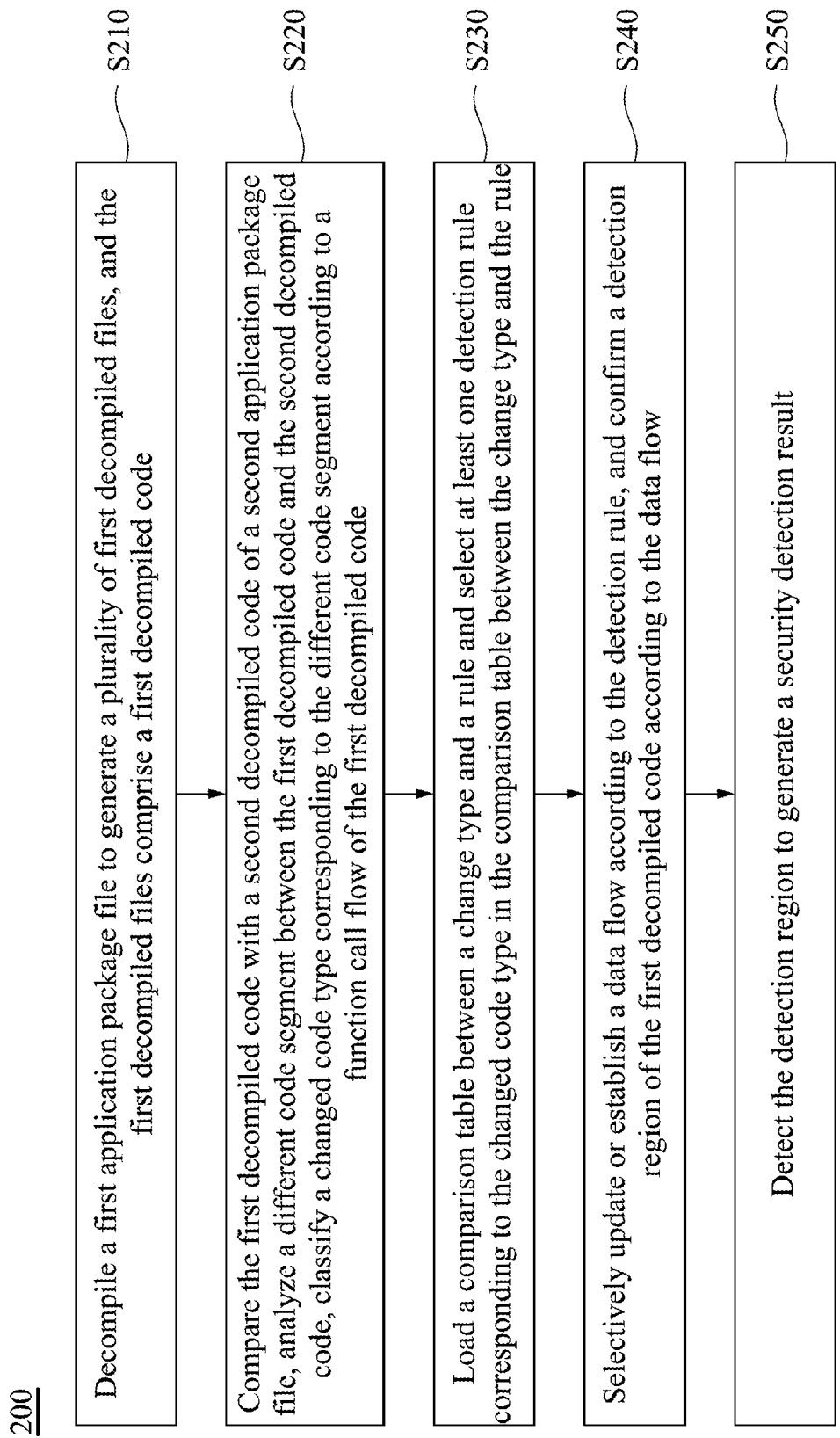
FIG. 2 depicts a flowchart of a detection method according to one embodiment of this invention.

A description is provided with reference to FIG. 1, FIG. 2, and FIG. 3. FIG. 1 depicts a block diagram of a detection system 100 according to one embodiment of this invention. FIG. 2 depicts a flowchart of a detection method 200 according to one embodiment of this invention. FIG. 3 depicts a schematic diagram of a correspondence table between a change type and a rule 300 according to one embodiment of this invention. In one embodiment, a detection system 100 includes a decompiler module 110, a module for comparing and classifying a revised application variance 130, and an information security detection module 150 as shown in FIG. 1. In another embodiment, the detection system 100 further includes a storage device 180 and a report module 170. The storage device 180 is configured to store the correspondence table between the change type and the rule 300, a report, at least one detection rule, information of an old version of an application package file, and a security detection result. The report module 170 is configured to generate a report according to the security detection result, and generate an updated report according to an updated security detection result each time. In one embodiment, the report can be stored in the storage device 180.

As shown in FIG. 1, the storage device 180 may be implemented by a read-only memory, a flash memory, a floppy disk, a hard disk, an optical disk, a flash disk, a magnetic tape, a database accessible via a network, or a storage medium that can be easily conceived by those of ordinary skill in the art and has the same function. In addition, the decompiler module 110, the module for comparing and classifying the revised application variance 130, the information security detection module 150, and the report module 170 may be respectively implemented or combined and implemented by, for example, a microcontroller, a microprocessor, a digital signal processor, an application specific integrated circuit (ASIC), or a logic circuit.

In step S210, the decompiler module 110 is configured to decompile a first application package file to generate a plurality of first decompiled files, and the first decompiled files include a first decompiled code.

In one embodiment, the first application package file may be in a setup file format for an application in an Android operating system, such as an Android package (generally referred to as APK) file. The decompiler module 110 can generate the plurality of first decompiled files through decompiling the APK file. In one embodiment, each of the first decompiled files may be a smali file. Since those of ordinary skill in the art should understand the technical content of decompiling the APK file to the smali files with a known method, or would apply an existing software package to directly decompile the APK file to the smali files, a description in this regard is not provided. In addition, the first application package file is not limited to the APK file. The first application package file may also be some other type of program.

In step S220, the module for comparing and classifying the revised application variance 130 is configured to compare the first decompiled code with a second decompiled code of a second application package file, analyze a different code segment between the first decompiled code and the second decompiled code, classify a changed code type corresponding to the different code segment according to a function call flow of the first decompiled code.

In one embodiment, the first application package file is a new version of an application package file, and the second application package file is an old version of the application package file. In one embodiment, the old version of the application package file is stored in the storage device 180, and the old version of the application package file includes information of the old version of the application package file. The information of the old version of the application package file includes a creation date, a modified date, a file size, a file type, a last access date, a file location of the old version of the application package file and/or a plurality of second decompiled files. The second decompiled files include the second decompiled code.

In one embodiment, the decompiler module 110 is further configured to decompile the second application package file (such as the old version of the application package file) to generate the plurality of second decompiled files, and store the second decompiled files in a database of the storage device 180. In the present embodiment, the second decompiled files include the second decompiled code.

In one embodiment, the second decompiled files exist in a database of the storage device 180, and the second decompiled files correspond to the second application package file.

Then, the module for comparing and classifying the revised application variance 130 compares the first decompiled files with the second decompiled files (for example compares contents of decompiled files having a same file name) to obtain a variance file in the first decompiled files, and the variance file includes the first decompiled code. The module for comparing and classifying the revised application variance 130 can further analyze a decompiled code in the variance file by finding the variance file in the first decompiled file. In one embodiment, the module for comparing and classifying the revised application variance 130 can find a different code segment between the first decompiled code (such as a decompiled code of the new version of the application package file) and the second decompiled code (such as a decompiled code of the old version of the application package file) by comparing bytes, strings, function names, file names, etc. In one embodiment, there are a plurality of different code segments between the first decompiled code and the second decompiled code. In one embodiment, the second decompiled code (such as the decompiled code of the old version of the application package file) can be obtained by loading historical data from the storage device 180, a cloud storage space, or any database.

In one embodiment, the module for comparing and classifying the revised application variance 130 classifies the changed code type corresponding to the different code segment according to a function call flow of the first decompiled code. The changed code type may include at least one of a parameter value variance, a single function call variance, and a function call flow variance. A further description for illustrating a method for defining the changed code type is provided as follows.

In one embodiment, when the module for comparing and classifying the revised application variance 130 analyzes that the different code segment between the first decompiled code and the second decompiled code includes a parameter value variance, the changed code type is defined as a parameter value variance type.

For example, when both the first decompiled code (such as the decompiled code of the new version of the application package file) and the second decompiled code (such as the decompiled code of the old version of the application package file) have a specific parameter respectively, and the specific parameter is set as 2 in the second decompiled code and revised to 3 in the first decompiled code, the module for comparing and classifying the revised application variance 130 can find and analyze the different code segment (such as a code segment in which the specific parameter is changed from 2 to 3), so as to obtain a changed code type corresponding to the different code segment after comparing the first decompiled code with the second decompiled code. In addition, the module for comparing and classifying the revised application variance 130 classifies the changed code type with respect to the parameter value variance as the parameter value variance type.

In one embodiment, when the module for comparing and classifying the revised application variance 130 analyzes that the different code segment between the first decompiled code and the second decompiled code includes a single function call variance, the changed code type is defined as a single function call variance type. In one embodiment, the module for comparing and classifying the revised application variance 130 can determine whether the different code segment between the first decompiled code and the second decompiled code includes a single function call variance by analyzing the function call flow of the first decompiled code.

For example, when the first decompiled code (such as the decompiled code of the new version of the application package file) has a specific function (such as a system call) and the second decompiled code (such as the decompiled code of the old version of the application package file) does not have a specific function, it means that the specific function is further added to the first decompiled code as compared with the second decompiled code. Under the circumstances, the module for comparing and classifying the revised application variance 130 can find and analyze the different code segment (such as a code segment in the first decompiled code in which the specific function is added to the first decompiled code) so as to obtain a changed code type corresponding to the different code segment. In this manner, the module for comparing and classifying the revised application variance 130 can classify the changed code type with respect to the single function call variance (such as adding a system call) as the single function call variance type.

In another embodiment, when the first decompiled code does not have a specific function but the second decompiled code has a specific function, it means that the specific function is further removed from the first decompiled code as compared with the second decompiled code. Under the circumstances, the module for comparing and classifying the revised application variance 130 can find and analyze the different code segment (such as a code segment in the first decompiled code in which the specific function has been removed from the first decompiled code) so as to obtain a changed code type corresponding to the different code segment. In this manner, the module for comparing and classifying the revised application variance 130 can classify the changed code type with respect to the single function call variance (such as removing a system call) as the single function call variance type.

In one embodiment, when the module for comparing and classifying the revised application variance 130 analyzes that the different code segment between the first decompiled code and the second decompiled code includes a function call flow variance, the changed code type is defined as a function call flow variance type. In one embodiment, the module for comparing and classifying the revised application variance 130 can determine whether the different code segment between the first decompiled code and the second decompiled code includes a function call flow variance by analyzing the function call flow of the first decompiled code.

For example, when a first function, a second function, and a third function are sequentially called in the second decompiled code (such as the decompiled code of the old version of the application package file) and a calling sequence in the first decompiled code (such as the decompiled code of the new version of the application package file) is changed to the first function, a fourth function, and the third function, the module for comparing and classifying the revised application variance 130 classifies the changed code type with respect to the function call flow variance as the function call flow variance type.

In another embodiment, when the calling sequence in the second decompiled code (such as the decompiled code of the old version of the application package file) is the first function, the second function, and the third function, and the calling sequence in the first decompiled code (such as the decompiled code of the new version of the application package file) is changed to the first function, the fourth function, and the third function. Wherein, the fourth function is obtained by repackaging the second function by a programmer. The module for comparing and classifying the revised application variance 130 also classifies the changed code type with respect to the function call flow variance as the function call flow variance type.

In one embodiment, the module for comparing and classifying the revised application variance 130 can analyze a plurality of different code segments between the first decompiled code and the second decompiled code, and a change type of each of the different code segments can be defined as at least one of the parameter value variance type, the single function call variance type, and the function call flow variance type.

In step S230, the module for comparing and classifying the revised application variance 130 is further configured to load the correspondence table between the change type and the rule 300 and select at least one detection rule corresponding to the changed code type in the correspondence table between the change type and the rule 300. In one embodiment, the at least one detection rule further includes a first rule, the second rule, and the third rule, and the changed code type can be corresponded to at least one of the first rule, the second rule, and the third rule according to the correspondence table between the change type and the rule 300. In this manner, the module for comparing and classifying the revised application variance 130 can select the at least one of the first rule, the second rule, and the third rule corresponding to the changed code type.

In one embodiment, as shown in FIG. 3, when the changed code type corresponding to the different code segment includes the function call flow variance type, the module for comparing and classifying the revised application variance 130 selects the third rule according to the correspondence table between the change type and the rule 300.

In one embodiment, when the changed code type corresponding to the different code segment includes the single function call variance type, the module for comparing and classifying the revised application variance 130 selects the second rule according to the correspondence table between the change type and the rule 300.

In one embodiment, when the changed code type corresponding to the different code segment includes the single function call variance type and the function call flow variance type at the same time, the module for comparing and classifying the revised application variance 130 selects the second rule and the third rule according to the correspondence table between the change type and the rule 300.

In one embodiment, when the changed code type corresponding to the different code segment includes the parameter value variance type and the function call flow variance type at the same time, the module for comparing and classifying the revised application variance 130 selects the first rule and the third rule according to the correspondence table between the change type and the rule 300.

It is thus understood that the module for comparing and classifying the revised application variance 130 can select the at least one of the first rule, the second rule, and the third rule corresponding to the changed code type. In addition, according to the correspondence table between the change type and the rule 300, other corresponding methods between the changed code types and the detection rules can also be deduced by analogy, and a description in this regard is not provided.

However, those of ordinary skill in the art should understand that the present invention is not limited to the configurations or corresponding methods shown in the correspondence table between the change type and the rule 300. The corresponding methods between the changed code types and the detection rules in the correspondence table between the change type and the rule 300 can be adjusted depending on practical implementations. Additionally, the correspondence table between the change type and the rule 300 can be set by a user in advance and stored in a database in the storage device 180.

Figure 4:
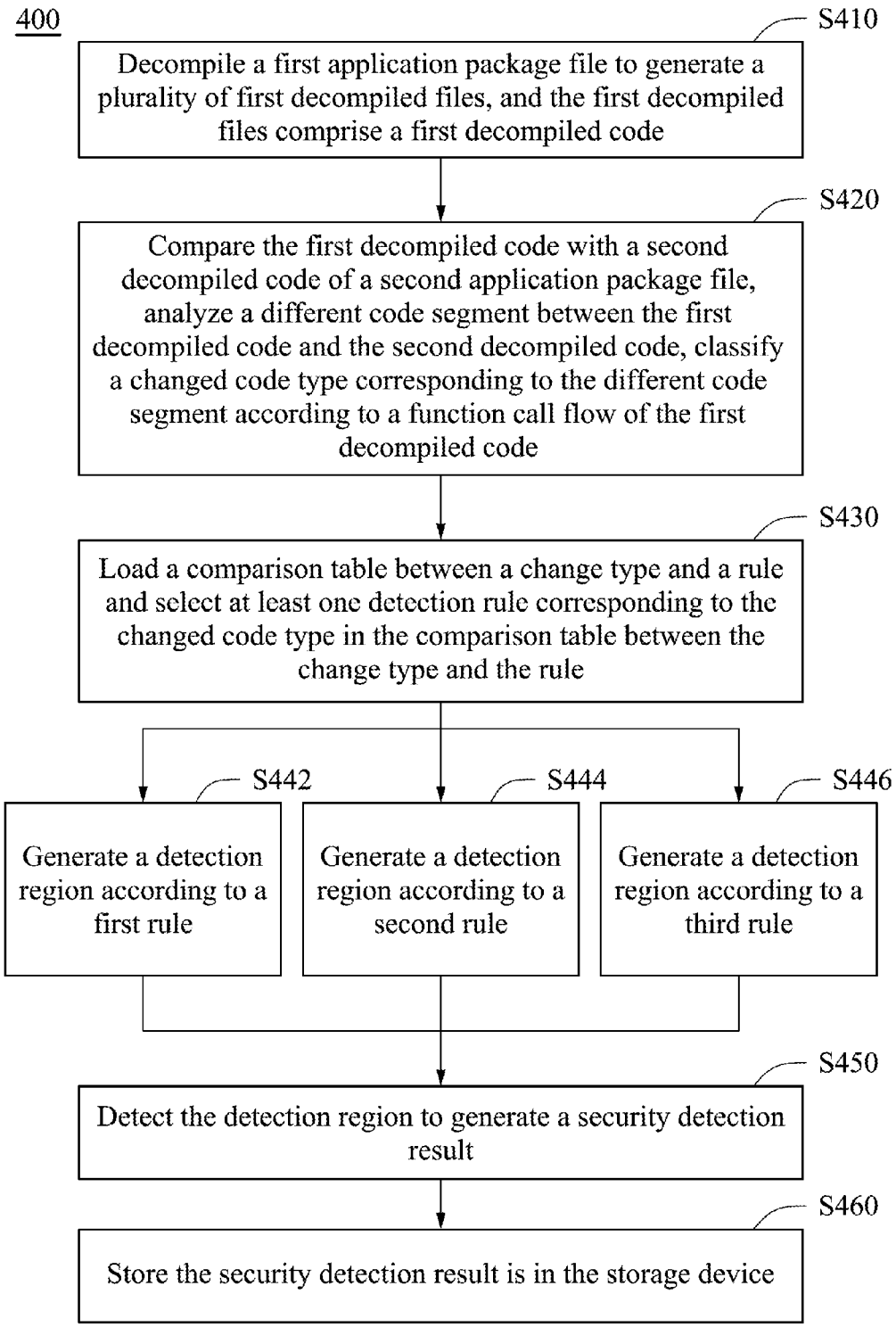
FIG. 4 depicts a flowchart of a detection method according to another embodiment of this invention.

In addition to that, a detailed description of the detection rules, such as relevant technical features of the first rule, the second rule, and the third rule, is provided in the paragraphs of the specification corresponding to FIG. 4.

In step S240, the information security detection module 150 is configured to selectively update or establish a data flow according to the at least one detection rule, and confirm a detection region of the first decompiled code according to the data flow.

In one embodiment, the module for comparing and classifying the revised application variance 130 selects the at least one detection rule in step S230, and the information security detection module 150 determines whether there is a need for updating or establishing the data flow. For example, when a changed parameter value is transmitted to a specific function that has not been changed, an operation result of the specific function will be changed. Hence, when the information security detection module 150 determines that the different code segment in the first decompiled code will affect data flow of the other code segments, the information security detection module 150 will update the data flow. In one embodiment, when the information security detection module 150 determines that the first decompiled code has a new parameter, the information security detection module 150 will establish the data flow according to the new parameter.

In step S250, the information security detection module 150 is further configured to detect the detection region so as to generate a security detection result. In one embodiment, the information security detection module 150 can detect the detection region of the first decompiled code confirmed by the data flow, for example, detect a region comprising a parameter and parameters and functions relating to the parameter, so as to generate the security detection result. In one embodiment, the security detection result can be displayed at a user interface (not shown in the figure). For example, the security detection result can be used to display a changed encryption setting parameter in the new version of the application package file to allow the user to know that the encryption method of the new version of the application package file is changed from the transport layer security (TLS) encryption method having a higher security to the secure sockets layer (SSL) encryption method having a lower security. In one embodiment, the report module 170 is configured to generate a report according to the security detection result.

In addition, in one embodiment, the above detection method 200 may be implemented by a computer program stored in a non-volatile computer readable recording medium, and the non-volatile computer readable recording medium is configured to perform the detection method 200.

Then, a description is provided with reference to FIG. 1 to FIG. 4. FIG. 4 depicts a flowchart of a detection method 400 according to another embodiment of this invention. To simplify matters, the operations performed by the detection system 100 shown in FIG. 1 will be described together with the detection method 400. Since steps S410, S420, S430, S450 in FIG. 4 are respectively the same as the steps S210, S220, S230, S250 shown in FIG. 2, a detailed description of these steps is not provided herein.

In step S430, the module for comparing and classifying the revised application variance 130 loads the correspondence table between the change type and the rule 300 and selects at least one detection rule corresponding to the changed code type in the correspondence table between the change type and the rule 300. In one embodiment, the at least one detection rule includes a first rule, a second rule, and a third rule, and the module for comparing and classifying the revised application variance 130 is configured to select at least one of the first rule, the second rule, and the third rule corresponding to the changed code type.

For example, when the changed code type is the function call flow variance type, the module for comparing and classifying the revised application variance 130 selects to perform the third rule according to the correspondence table between the change type and the rule 300. For example, when the changed code type is the single function call variance type, the module for comparing and classifying the revised application variance 130 selects to perform the second rule according to the correspondence table between the change type and the rule 300. For example, when the changed code type is the parameter value variance type, the module for comparing and classifying the revised application variance 130 selects to perform the first rule according to the correspondence table between the change type and the rule 300.

Then, the detection system 100 selectively performs steps S442, S444 and/or S446 correspondingly according to the at least one of the first rule, the second rule, and the third rule selected by the module for comparing and classifying the revised application variance 130. In greater detail, the at least one detection rule further includes the first rule, the second rule, and the third rule according to one embodiment, and the detection system 100 can find the detection rule correspondingly according to the changed code type determined in step S420. For example, the parameter value variance type corresponds to the first rule. The single function call variance type corresponds to the second rule. The function call flow variance type corresponds to the third rule.

In one embodiment, when the changed code type is classified as the parameter value variance type, the module for comparing and classifying the revised application variance 130 selects the first rule and the detection system 100 performs step S442 to allow the detection system 100 to generate a detection region according to the first rule.

In one embodiment, when the changed code type is classified as the single function call variance type, the module for comparing and classifying the revised application variance 130 selects the second rule and the detection system 100 performs step S444 to allow the detection system 100 to generate a detection region according to the second rule.

In one embodiment, when the changed code type is classified as the function call flow variance type, the module for comparing and classifying the revised application variance 130 selects the third rule and the detection system 100 performs step S446 to allow the detection system 100 to generate a detection region according to the second rule.

In one embodiment, when the changed code type is classified to include the parameter value variance type and the single function call variance type at the same time, the module for comparing and classifying the revised application variance 130 selects the first rule and the second rule and the detection system 100 performs step S442 and step S444 simultaneously or sequentially.

Then, the methods for determining the detection regions according to the first rule, the second rule, and the third rule are further illustrated as follows. However, those of ordinary skill in the art should understand that the methods for determining the detection regions are not limited to the following embodiments.

In one embodiment, when the module for comparing and classifying the revised application variance 130 selects the first rule, the step S442 is performed.

In step S442, the information security detection module 150 updates or establishes a data flow and confirms the detection region of the first decompiled code according to the data flow.

For example, when the changed code type includes the parameter value variance type, the module for comparing and classifying the revised application variance 130 selects the first rule. All code segments relating to the parameter value variance in the first decompiled code are detected by using the first rule to update (or establish) the data flow related to the parameter value variance and the code segments in which variances happen are regarded as the detection region.

It is thus understood that by selecting the first rule, the information security detection module 150 can track the data flow of the code segments in which the variances happened to detect code segments in the detection region in which the code does not change but the parameter value or data do change. Thus, functions or some other code segments that use the changed parameter value can be further traced.

In one embodiment, when the module for comparing and classifying the revised application variance 130 selects the second rule, the step S444 is performed.

In step S444, the module for comparing and classifying the revised application variance 130 detects a part where a single function is changed in the first decompiled code according to a function call flow and regards the changed single function as the detection region.

For example, when the changed code type includes the single function call variance type (for example the variance part is to add or remove calling a specific function), the module for comparing and classifying the revised application variance 130 selects the second rule. In one embodiment, the detection system 100 can detect a variance state of the specific function (such as a system call) in the first decompiled code by using the second rule and determine the detection region according to the specific function.

In some embodiments, since the single function call variance type does not affect the data flow, the second rule may not involve detecting a part where the data flow is changed.

In one embodiment, when the module for comparing and classifying the revised application variance 130 selects the third rule, the step S446 is performed.

In step S446, the information security detection module 150 updates (or establishes) the data flow, and then confirms the detection region of the first decompiled code according to the function call flow and the data flow.

For example, when the changed code type includes the function call flow variance type, the module for comparing and classifying the revised application variance 130 selects the third rule. Since the function call flow is likely to cause changes of the application control flow and/or data flow, all code segments relating to the function call flow variance and the data flow variance in the first decompiled code can be detected by using the third rule, for example, track a control call sequence between a plurality of functions and track parameters or data transmitted between a plurality of functions. In this manner, the detection system 100 can update (or establish) the function call flow and the data flow of the first decompiled code according to the third rule, and regard the code segments relating to the function call flow variance and the data flow variance as the detection region.

In step S450, the information security detection module 150 is configured to detect the detection region to generate a security detection result. Since step S450 is the same as step S250 shown in FIG. 2, a description in this regard is not provided.

In step S460, the security detection result is stored in the storage device 180.

In this manner, when the application is updated, the information security detection module 150 can only detect the part of the new version of the application where the variance happens and generate the security detection result through only detecting a detection region of the first decompiled code (such as the decompiled code of the new version of the application package file). In other words, the detection system 100 does not need to detect the whole first decompiled code. As a result, the present invention can save the detection time and manpower.

The above technical scheme can detect the different code segment between the application that has not been revised and the new version of the application. Hence, the security detection result of the new version of the application can be obtained by only detecting the different code segment and the program relating to the different code segment. That is, the present invention detection system does not need to detect the whole new version of the application. Therefore, the present invention avoids the repeated consumption of the detection resources and provides a more efficient detection system and a method thereof.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A detection system comprising:
a decompiler module configured to decompile a first application package file to generate a plurality of first decompiled files, and the first decompiled files comprising a first decompiled code;
a module for comparing and classifying a revised application variance configured to compare the first decompiled code with a second decompiled code of a second application package file, analyze a different code segment between the first decompiled code and the second decompiled code, classify a changed code type corresponding to the different code segment according to a function call flow of the first decompiled code, load a correspondence table between a change type and a rule, and select at least one detection rule corresponding to the changed code type in the correspondence table between the change type and the rule, wherein the changed code type comprises a parameter value variance type, a single function call variance type, and a function call flow variance type; and
an information security detection module configured to selectively update or establish a data flow according to the at least one detection rule, and confirm a detection region of the first decompiled code according to the data flow, and detect the detection region to generate a security detection result to store,
wherein the decompiler module, the module for comparing and classifying the revised application variance, and the information security detection module are implemented with at least one processing circuit,
wherein the first decompiled code is from a new first application package file and the second decompiled code is from an old second application package file, and
the parameter value variance type representing a type that a values of a specific parameter in the first decompiled code is revised to another value of the specific parameter in the second decompiled code, and
the single function call variance type representing a type that the first decompiled code does not have a specific function but the second decompiled code has the specific function, or the first decompiled code has the specific function but the second decompiled code does not have the specific function, and
the function call flow variance type representing a type that at least one function in a calling sequence in the first decompiled code is changed to another function in the second decompiled code.

2. The detection system of claim 1, wherein the first application package file is a new version of an application package file, the second application package file is an old version of the application package file, the old version of the application package file is stored in a storage device, the old version of the application package file comprises information of the old version of the application package file, the information of the old version of the application package file comprises a creation date, a modified date, a file size, a file type, a last access date, and a file location of the old version of the application package file and a plurality of second decompiled files.

3. The detection system of claim 2, further comprising:
a report module configured to generate a report according to the security detection result;
wherein the storage device is further configured to store the correspondence table between the change type and the rule, the report, the at least one detection rule, the information of the old version of the application package file, and the security detection result.

4. The detection system of claim 2, wherein the second decompiled files exist in a database of the storage device, the second decompiled files correspond to the second application package file, the second decompiled files comprise the second decompiled code, the module for comparing and classifying the revised application variance is further configured to compare the first decompiled files with the second decompiled files to obtain a variance file in the first decompiled files, and the variance file comprises the first decompiled code.

5. The detection system of claim 1, wherein when the module for comparing and classifying the revised application variance analyzes that the different code segment between the first decompiled code and the second decompiled code comprises a parameter value variance, the changed code type is classified as the parameter value variance type;
when the module for comparing and classifying the revised application variance analyzes that the different code segment between the first decompiled code and the second decompiled code comprises a single function call variance, the changed code type is classified as the single function call variance type; and
when the module for comparing and classifying the revised application variance analyzes that the different code segment between the first decompiled code and the second decompiled code comprises a function call flow variance, the changed code type is classified as the function call flow variance type.

6. The detection system of claim 1, wherein the at least one detection rule comprises a first rule, a second rule, and a third rule, and the module for comparing and classifying the revised application variance selects at least one of the first rule, the second rule, and the third rule corresponding to the changed code type.

7. The detection system of claim 1, wherein the at least one detection rule comprises a first rule, a second rule, and a third rule, and the parameter value variance type corresponds to the first rule, the single function call variance type corresponds to the second rule, the function call flow variance type corresponds to the third rule.

8. A detection method comprising:
decompiling a first application package file to generate a plurality of first decompiled files, and the first decompiled files comprising a first decompiled code;
comparing the first decompiled code with a second decompiled code of a second application package file, analyzing a different code segment between the first decompiled code and the second decompiled code, classifying a changed code type corresponding to the different code segment according to a function call flow of the first decompiled code, wherein the changed code type comprises a parameter value variance type, a single function call variance type, and a function call flow variance type;

loading a correspondence table between a change type and a rule, and selecting at least one detection rule corresponding to the changed code type in the correspondence table between the change type and the rule;

updating or establishing a data flow according to the at least one detection rule selectively, and confirming a detection region of the first decompiled code according to the data flow; and detecting the detection region to generate a security detection result to store, wherein the first decompiled code is from a new first application package file and the second decompiled code is from an old second application package file, and the parameter value variance type representing a type that a value of a specific parameter in the first decompiled code is revised to another value of the specific parameter in the second decompiled code, and the single function call variance type representing a type that the first decompiled code does not have a specific function but the second decompiled code has the specific function, or the first decompiled code has the specific function but the second decompiled code does not have the specific function, and the function call flow variance type representing a type that at least one function in a calling sequence in the first decompiled code is changed to another function in the second decompiled code.

9. The detection method of claim 8, wherein the first application package file is a new version of an application package file, the second application package file is an old version of the application package file, the old version of the application package file is stored in a storage device, the old version of the application package file comprises information of the old version of the application package file, the information of the old version of the application package file comprises a creation date, a modified date, a file size, a file type, a last access date, and a file location of the old version of the application package file and a plurality of second decompiled files.

10. The detection method of claim 1, further comprising:
generating a report according to the security detection result;
storing the correspondence table between the change type and the rule, the report, the at least one detection rule, the information of the old version of the application package file, and the security detection result in the storage device.

11. The detection method of claim 9, wherein the second decompiled files exist in a database of the storage device, the second decompiled files correspond to the second application package file, the second decompiled files comprise the second decompiled code, and
the first decompiled files are compared with the second decompiled files to obtain a variance file in the first decompiled files, and the variance file comprises the first decompiled code.

12. The detection method of claim 8, wherein the step of analyzing the different code segment between the first decompiled code and the second decompiled code, classifying the changed code type corresponding to the different code segment according to the function call flow of the first decompiled code further comprises:
classifying the changed code type as the parameter value variance type when the different code segment between the first decompiled code and the second decompiled code comprises a parameter value variance;
classifying the changed code type as the single function call variance type when the different code segment between the first decompiled code and the second decompiled code comprises a single function call variance; and
classifying the changed code type as the function call flow variance type when the different code segment between the first decompiled code and the second decompiled code comprises a function call flow variance.

13. The detection method of claim 8, wherein the at least one detection rule comprises a first rule, a second rule, and a third rule, and the step of selecting the at least one detection rule corresponding to the changed code type in the correspondence table between the change type and the rule further comprise:
selecting at least one of the first rule, the second rule, and the third rule corresponding to the changed code type.

14. The detection method of claim 8, wherein the at least one detection rule comprises a first rule, a second rule, and a third rule, and the parameter value variance type corresponds to the first rule, the single function call variance type corresponds to the second rule, the function call flow variance type corresponds to the third rule.

15. A non-transitory computer readable recording medium storing a computer program configured to perform a detection method applied to a detection system, wherein the detection method comprises:
decompiling a first application package file to generate a plurality of first decompiled files, and the first decompiled files comprising a first decompiled code;
comparing the first decompiled code with a second decompiled code of a second application package file, analyzing a different code segment between the first decompiled code and the second decompiled code, classifying a changed code type corresponding to the different code segment according to a function call flow of the first decompiled code;
loading a correspondence table between a change type and a rule, and selecting at least one detection rule corresponding to the changed code type in the correspondence table between the change type and the rule, wherein the changed code type comprises a parameter value variance type, a single function call variance type, and a function call flow variance type;
updating or establishing a data flow according to the at least one detection rule selectively, and confirming a detection region of the first decompiled code according to the data flow; and
detecting the detection region to generate a security detection result to store,
wherein the first decompiled code is from a new first application package file and the second decompiled code is from an old second application package file, and
the parameter value variance type representing a type that a values of a specific parameter in the first decompiled code is revised to another value of the specific parameter in the second decompiled code, and
the single function call variance type representing a type that the first decompiled code does not have a specific function but the second decompiled code has the specific function, or the first decompiled code has the specific function but the second decompiled code does not have the specific function, and the function call flow variance type representing a type that at least one function in a calling sequence in the first decompiled code is changed to another function in the second decompiled code.

\* \* \* \* \*